(12) United States Patent
Aiken (10) Patent No.: US 8,029,229 B2
(45) Date of Patent: Oct. 4, 2011

(54) COMPENSATOR FOR ROBOTIC ARM

(75) Inventor: Duane Aiken, Rosman, NC (US)

(73) Assignee: Duane Aiken, Brevard, NC (US)

( * ) Notice: Subject to any disclaimer, the term of this patent is extended or adjusted under 35 U.S.C. 154(b) by 296 days.

(21) Appl. No.: 12/510,024

(22) Filed: Jul. 27, 2009

(65) Prior Publication Data

US 2010/0018339 A1    Jan. 28, 2010

Related U.S. Application Data

(60) Provisional application No. 61/083,643, filed on Jul. 25, 2008.

(51) Int. Cl.
*G05B 11/00* (2006.01)

(52) U.S. Cl. .................................. 414/729; 74/490.06

(58) Field of Classification Search .................. 414/729; 901/29, 40; 74/490.06; 403/11, 383, 322.1
See application file for complete search history.

(56) References Cited

U.S. PATENT DOCUMENTS 5,361,881 A * 11/1994 Simond ........................ 192/55.1
5,697,257 A * 12/1997 Oh .............................. 74/490.06

* cited by examiner

*Primary Examiner* — Donald Underwood
(74) *Attorney, Agent, or Firm* — Turner Padget Graham & Laney P.A.

(57) ABSTRACT

A robotic arm compensator includes a housing, a lock mandrel, a first lock slide, a second lock slide and an instrument attached to the lock mandrel. A method of using the robotic arm compensator includes moving the first and second lock slides in a direction toward each other to engage the lock mandrel in a first state and moving the lock slides apart from each other to disengage the lock mandrel in a second state for providing exceptional radial movement, large lateral travel relative to overall size, zero force to utilize the compensation travel and no axial compressibility.

15 Claims, 8 Drawing Sheets

COMPENSATOR FOR ROBOTIC ARM

CROSS-REFERENCE TO RELATED APPLICATIONS

The present application is a non-provisional application claiming priority to U.S. Provisional Patent Application Ser. No. 61/083,643, filed Jul. 25, 2008, the disclosure of which is hereby incorporated by reference herein, the one-year anniversary of the filing of which fell on a Saturday, thus extending the deadline for filing of the present non-provisional application to Jul. 27, 2009.

TECHNICAL FIELD

The present disclosure is directed, in general, to a robotic alignment device.

BACKGROUND

Centering or alignment devices are known, which compensate for positioning errors due to machine inaccuracy, misaligned components, vibration or tolerance. For instance, ATI Industrial Automation offers a "Remote Center Compliance" (RCC) device that uses a plurality of spring-loaded shear pads that align a part in a receiving hole. The RCC device is reliant on low lateral stiffness of the shear pads.

Another alignment device is offered by Robotic Accessories Division (RAD), which also provides a centralizing movement that is based on a series of ball bearings being driven into seats. The RAD device has limited lateral and radial allowances.

DE-STA-CO offers a variety of centering devices that have various limitations. For instance, DE-STA-CO's "Cylindrical Horizontal Compliance Device" is a horizontal compensator only. While it will allow for a radial movement, it will not return to its original radial position. The angular repeatability is only ±10°. Another DE-STA-CO device entitled "Lateral Compliance Device—Pneumatic Centering" only compensates in a lateral direction. This device allows no radial movement. Another device by DE-STA-CO entitled "Compliance Wrist" allows for both lateral and radial movement, but this device is akin to the ATI device noted above. The Compliance Wrist basically is a pair of plates connected by springs oriented at slight angles. The springs allow the plates to shift and/or rotate, and then urge the plates to return to their original position. This device offers no positive return for radial movement. Also, the limited range of movement (at most ±⅛" lateral and ±2° radial) plagues this design. Another shortfall with this design is the amount of force required to shift the plates. Its springs must be strong enough to support a load, which therefore require substantial force to utilize its misalignment capability. Stated another way, this arrangement can require several hundred inch pounds for deflection.

The industry is in need of a compensator for a robotic arm that has a relatively large size to lateral travel ratio, exceptional radial movement allowance, essentially zero force to utilize compensation travel, and no axial compressibility to permit use in applications requiring axial force.

SUMMARY

The present disclosure is directed generally to a robotic arm compensator generally including a housing with a lock mandrel located within the housing that is captured and released in various stages by opposing lock slides that may be placed into various states by a pinion or similar locomotive means.

According to one aspect of the present disclosure, a robotic arm compensator includes a housing having an instrument side and an adaptor side; a lock mandrel disposed between the instrument side and the adaptor side, the lock mandrel having a projection defining at least two surfaces disposed at an angle to each other; a first lock slide being configured to engage a first surface of the two surfaces in a first state and to disengage the first surface in a second state; a second lock slide opposing the first lock slide and being configured to engage a second surface of the two surfaces in the first state and to disengage the second surface in the second state; and an instrument attached to the lock mandrel proximate the instrument side, wherein, in or approaching the second state, a lock mandrel is configured to float between the first and second lock slides such that the instrument may move laterally and radially, a lock mandrel being disposed in the housing to limit axial movement of the lock mandrel.

In this aspect of the disclosure, the projection may include a third surface, the projection being triangular-shaped in cross section. Also, the first lock slide may define at least two receiving surfaces disposed at an angle to each other. The second lock slide may define a horizontal surface for engaging the second surface of the projection.

The present embodiment may also include the projection having a third surface in which the projection is triangular-shaped in cross section and the first lock slide defines at least two receiving surfaces disposed at an angle to each other for engaging the first and third surfaces of the projection in the first state, a second lock slide defining a horizontal surface for engaging the second surface of the projection in the first state. Those skilled in the art will appreciate that the triangular-shaped projection is but an example. The projection may have more than three surfaces, or even a rounded appearance, which of course would require complementary surfaces in the lock slides discussed below. Furthermore, the surfaces of the projection and/or the lock slides may meet at non-orthogonal or other angles as required.

Also in this aspect of the disclosure, the first lock slide may define a first gear rack and the second lock slide may define a second gear rack and further comprise a pinion in communication with the first and second gear racks, the pinion being configured to rotate, the first and second lock slides being configured to travel in opposing directions in the first and second states.

In other aspects of this embodiment, the instrument may be a gripper tool or a pneumatic gripper. The tool may be powered electrically, pneumatically, hydraulically or otherwise depending on assembly line requirements, codes, regulations, standards, and the like.

In a further aspect, the second lock slide may define a horizontal surface for engaging the second of the two surfaces of the projection. The two surfaces may be angled so as to be non-orthogonal, and as noted above, there may be more than a single horizontal surface, or it may be oriented differently depending on the construction of the projection.

The instrument may be configured to move laterally about one-quarter of an inch.

The robotic arm compensator in this embodiment may further comprise an axis, and the instrument may be configured to move radially about the axis up to about 25°.

The robotic arm compensator may operate without axial compression in the second state.

In a further aspect, the embodiment may include a plurality of gibs, the first and second lock slides being configured to travel on the gibs between the first and the second state. Additionally, or alternatively, a form of linear bearings, raceways or other guides may be used instead or in addition to the gibs.

This aspect may also include a propulsion unit in communication with one of the first or second lock slides. The propulsion unit may be a pneumatic air cylinder, which may be arranged internally to the housing or externally.

Also in this embodiment, a shock absorber may be disposed near one of the first and second lock slides, or both, to arrest movement of the lock slides in the second stage.

In a further embodiment, a method of using a robotic arm compensator may include providing a housing having an instrument side and an adaptor side; providing a lock mandrel disposed between the instrument side and the adaptor side, the lock mandrel having a projection defining at least two non-orthogonal surfaces; providing a first lock slide being configured to engage a first surface of the non-orthogonal surfaces in a first state and to disengage the first surface in a second state; a second lock slide opposing the first lock slide and being configured to engage a second surface of the non-orthogonal surfaces in the first state and to disengage the second surface in the second state, and attaching an instrument to the lock mandrel proximate the instrument side wherein, in or approaching the second state the lock mandrel is configured to float between the first and second lock slides such that the instrument may move laterally and radially, the lock mandrel being disposed in the housing to limit axial movement of the lock mandrel. The method may include the further steps of moving the first and second lock slides apart from each other to allow the lock mandrel to float in various ranges, such as up to about one-quarter inch of travel and up to about 25° of radial movement, although other ranges may be provided based on the needs of the industry and the size of the robotic arm compensator.

Evident from the foregoing introduction, the component parts of the robotic arm compensator are simple and economical to manufacture and use. Other advantages of the disclosure will be apparent from the following description and the attached drawing or can be learned through practice of the present subject matter.

Additional objects and advantages of the present subject matter are set forth in, or will be apparent to, those of ordinary skill in the art from the detailed description herein. Also it should be further appreciated that modifications and variations to the specifically illustrated, referred and discussed features and elements hereof may be practiced in various embodiments and uses of the disclosures without departing from the spirit and scope of the subject matter. Variations may include, but are not limited to, substitution of equivalent means, features or steps for those illustrated, referenced or discussed, and the functional, operational, or positional reversal of various parts, features, steps or the like.

Still further, it is to be understood that different embodiments, as well as differently presently preferred embodiments, of the present subject matter may include various combinations or configurations of presently disclosed features, steps or elements or their equivalents (including combinations of features, parts, or steps or configurations thereof not expressly shown in the figures or stated in the detailed description of such figures). Additional embodiments of the present subject matter, not necessarily expressed in the summarized section, may include and incorporate various combinations of aspects of features, components, or steps referenced in the summarized objects above, and are other features, components, or steps as otherwise discussed in this application. Those of ordinary skill in the art will better appreciate the features and aspects of such embodiments, and others upon review of the remainder of the specification.

BRIEF DESCRIPTION OF THE DRAWINGS

A full and enabling disclosure of the present subject matter, including the best mode thereof, directed to one of ordinary skill in the art, is set forth in the specification, which makes reference to the appended figures, in which.

DETAILED DESCRIPTION

Detailed reference will now be made to the drawings in which examples embodying the present subject matter are shown. The detailed description uses numerical and letter designations to refer to features of the drawings. Like or similar designations of the drawings and description have been used to refer to like or similar parts of various exemplary embodiments.

The drawings and detailed description provide a full and written description of the present subject matter, and of the manner and process of making and using various exemplary embodiments, so as to enable one skilled in the pertinent art to make and use them, as well as the best mode of carrying out the exemplary embodiments. However, the examples set forth in the drawings and detailed description are provided by way of explanation only and are not meant as limitations of the disclosure. The present subject matter thus includes any modifications and variations of the following examples as come within the scope of the appended claims and their equivalents.

It is to be understood by one of ordinary skill in the art that the following discussion simply describes exemplary embodiments and is not intended as limiting the broader aspects of the present disclosure.

Figure 2:
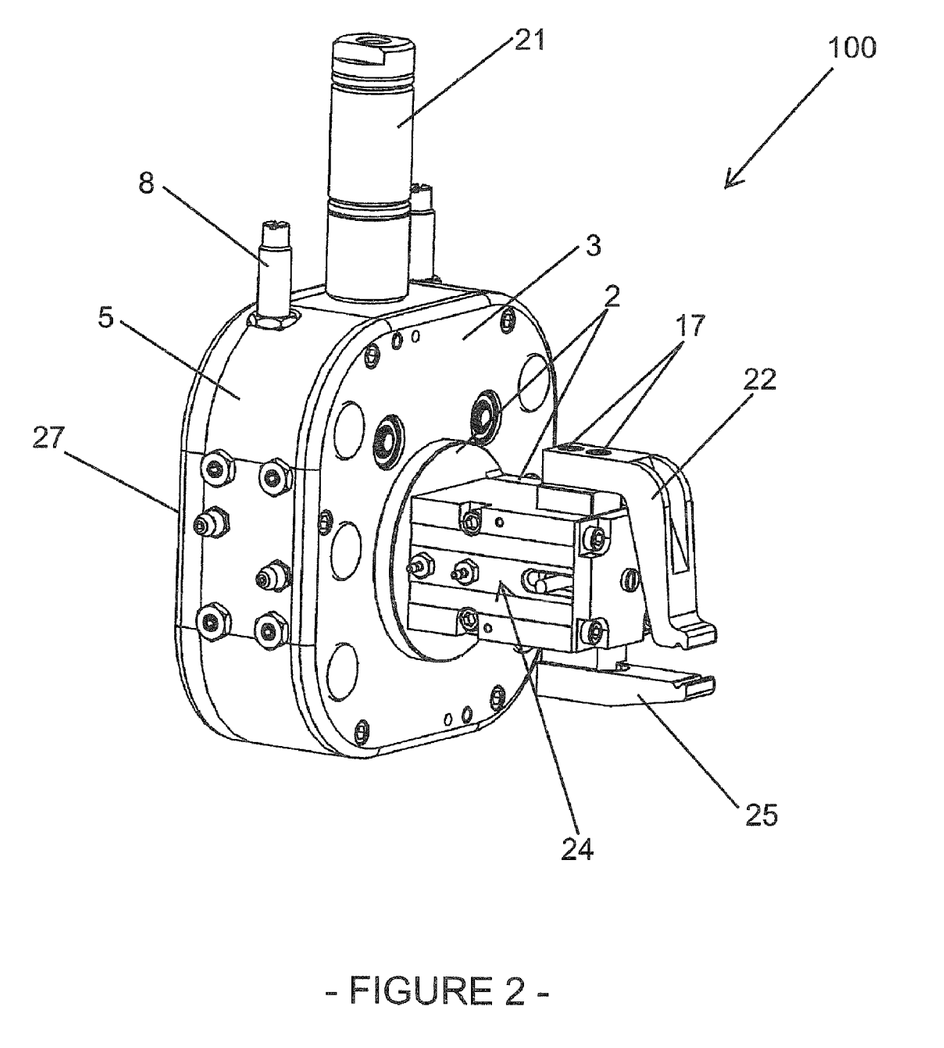
FIG. 2 is a perspective view of the robotic compensator arm as in FIG. 1.
Figure 3:
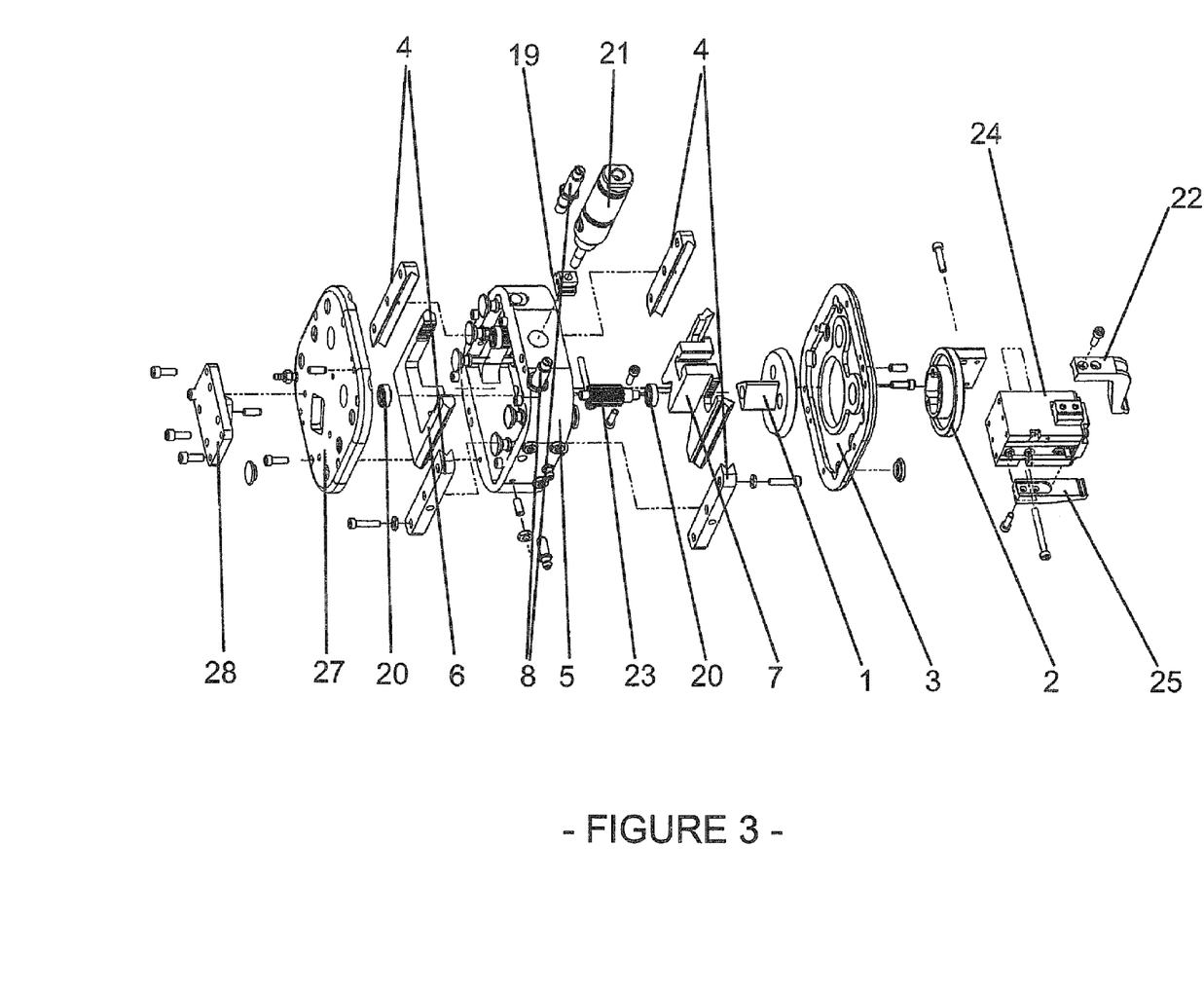
FIG. 3 is an exploded view of the robotic compensator arm as in FIG.
Figure 4A:
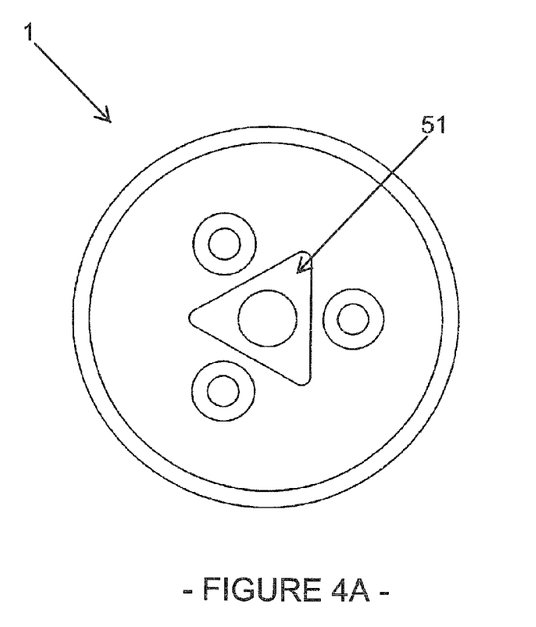
FIGS. 4A through 4C are views of a lock mandrel as used in FIG. 1, according to one aspect of the disclosure, as shown in an overhead elevational view, a side elevational view, and a perspective view.
Figure 4B:
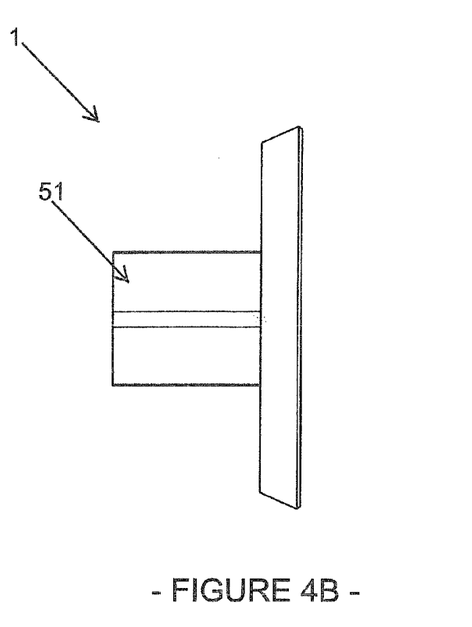
Figure 4C:
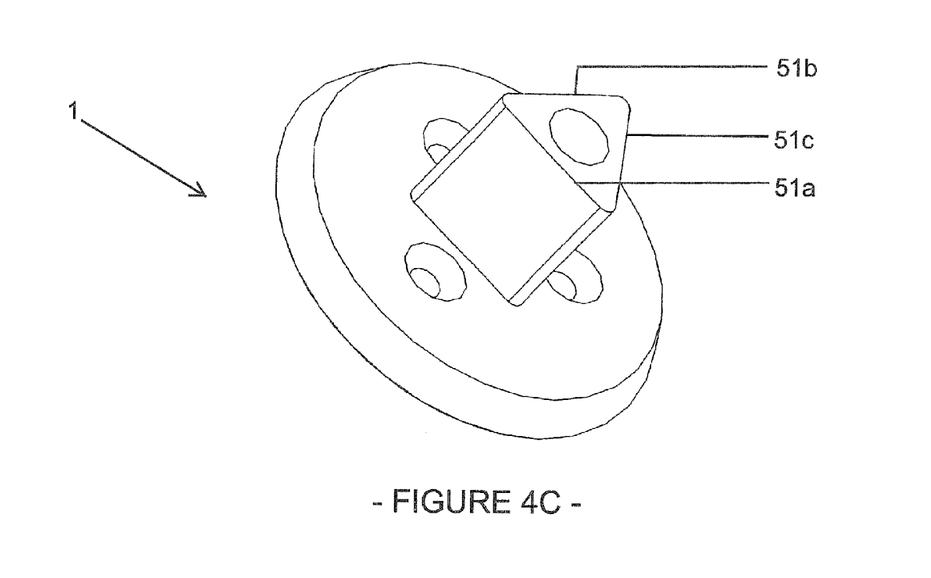
Figure 5A:
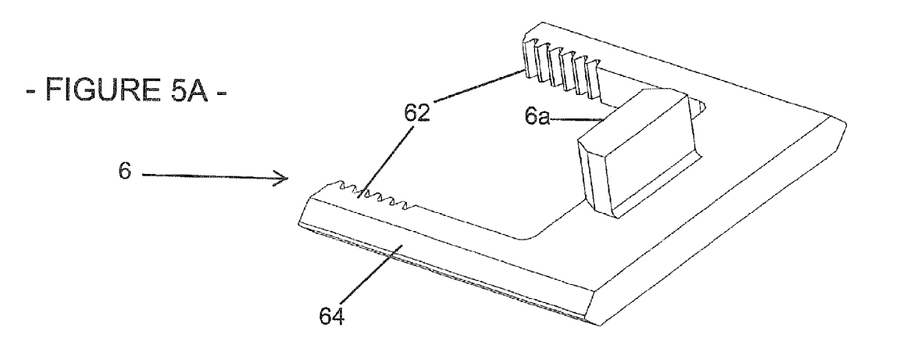
FIG. 5A is a perspective view of a first lock slide as used in FIG. 1, according to another aspect of the disclosure.
Figure 5B:
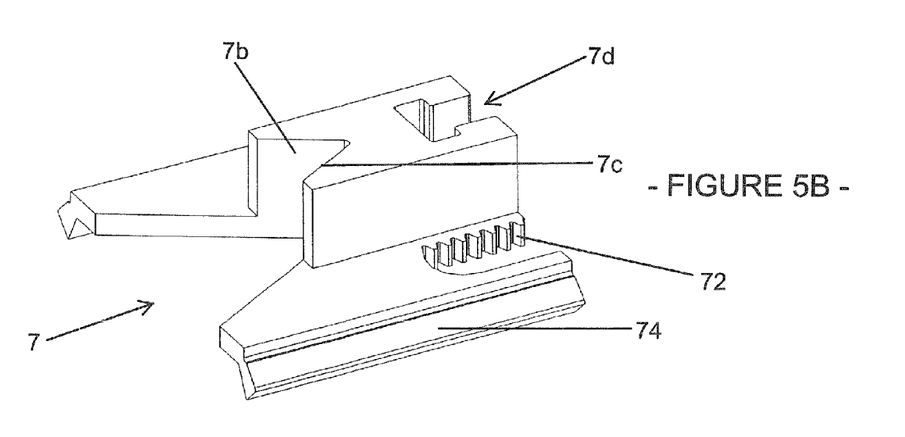
FIG. 5B is a perspective view of a second lock slide as used in FIG. 1, according to a further aspect of the disclosure.

Turning now to FIGS. 1-8, according to one aspect of the disclosure, a robotic arm compensator, designated in general by the element number 100, broadly includes a housing 5, opposing plates 3 and 27 that attach to the housing 5, a lock mandrel 1 (as shown in FIGS. 4A-4C) located within the housing 5, and two lock slides 6, 7 (as shown in FIGS. 5A and 5B). As will be described in detail herein, these and other components of the robotic arm compensator 100 are lightweight and may be easily removed, serviced and/or replaced to extend a service life of the robotic arm compensator 100. As also will be described herein, an instrument 24, such as a gripper or end effectors, may be attached to the instrument side plate 3 to adapt the robotic arm compensator 100 for a variety of tasks. The instrument 24 may be controlled electrically, hydraulically, or otherwise, depending on assembly line requirements and applications.

Figure 1:
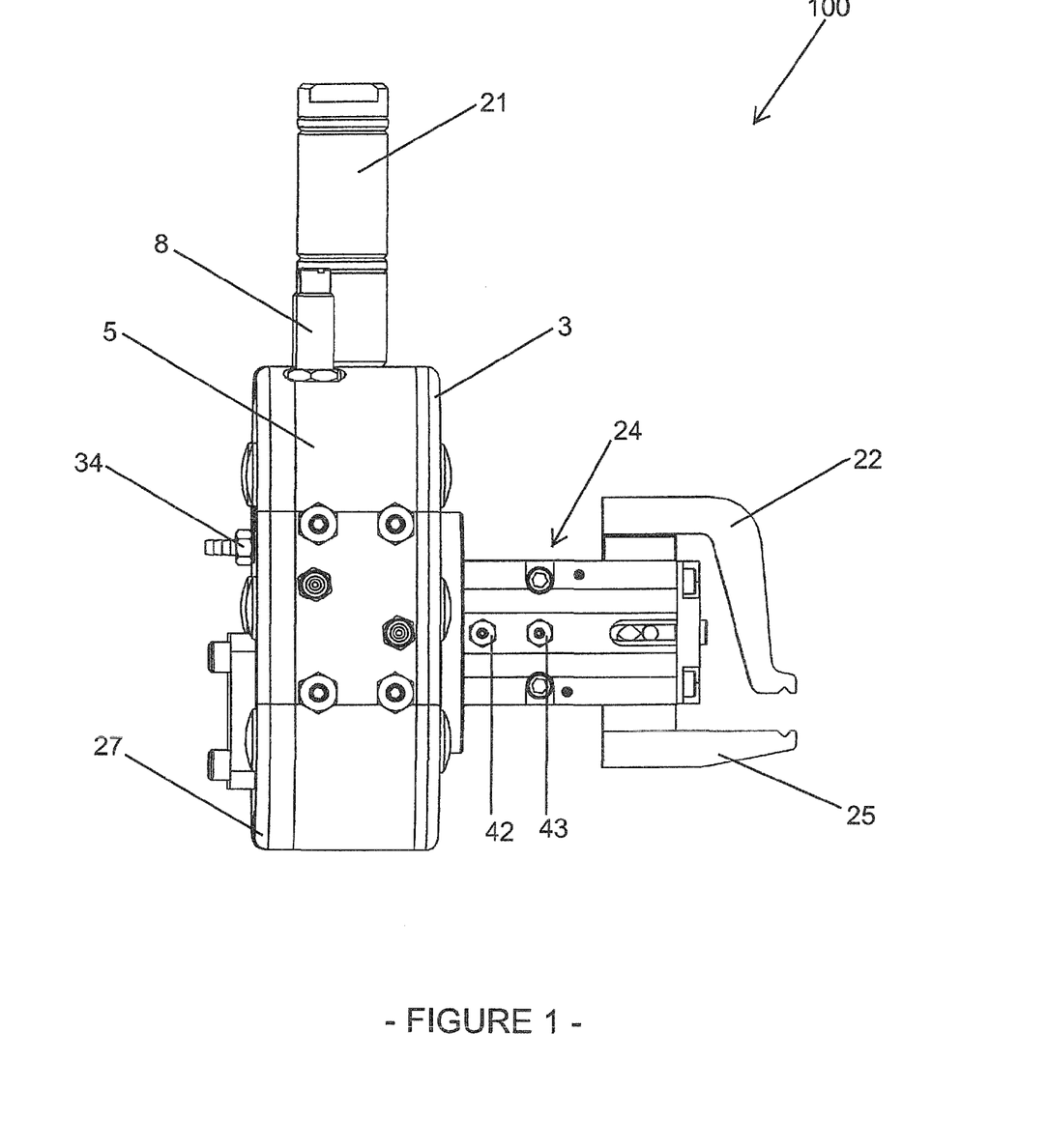
FIG. 1 is an elevational view of a robotic arm compensator according to one aspect of the disclosure.

As illustrated in FIGS. 1 and 2, the housing 5 includes a propulsion unit 21 in the form of a fluid cylinder, projecting from an upper surface thereof, which controls the movement of a lock slide 7 (shown in FIGS. 3 and 5B). One or more shock absorbers 8 may be located near the fluid cylinder 21 to arrest any rapid movements that may cause damage or premature wear to the locking surfaces of the lock slides 6, 7. According to one aspect, the fluid cylinder 21 is a pneumatic cylinder, although hydraulic cylinders may instead be used. A purge port 34 (visible in FIG. 1) projects from the plate 27 on the adaptor side, opposite the instrument assembly 24.

As shown, the instrument assembly 24 is a gripper-type assembly having upper and lower jaws 22, 25, although various types of instruments may instead be used. The instrument assembly 24, which is secured to the plate 3 via an instrument mount 2 using suitable attachment devices (e.g., 17), may also be pneumatically operated, using air supply ports 42, 43 (for closing and opening the gripper jaws 22, 25, for example). The gripper jaws 22, 25 are secured to the instrument assembly 24 using an attachment device 17, such as screws, rivets, or other suitable attachment means.

With particular reference to FIG. 3, the robotic arm compensator 100 includes the housing 5, which is surrounded by plates 3 and 27 (as briefly introduced above) and which contains the lock slide 6, the lock slide 7, and pinions 23 (only one of which is illustrated for clarity). The plate 3 on the instrument side of the housing 5 encloses the lock mandrel 1 and the lock slide 7, which in this example is a V-shaped lock slide as will be explained below, in the housing 5. On the adaptor side of the housing 5 as shown, the lock slide 6, which has a flat surface, is contained by the plate 27, which is also attached to the housing 5 by screws or other devices 17. A mounting adaptor plate 28 is attached to the plate 27, in order to attach the entire robotic arm compensator 100 to a robot (such as 200, shown in FIG. 7) of an assembly line.

Further as shown in FIG. 3, the lock mandrel 1 is arranged to provide a centralizing function. As noted above, the lock mandrel 1 is attached to the gripper mount 2 through a center hole in plate 3, which provides a capture through the plate 3. There is a small amount of clearance between the thickness of the plate 3 and the flanges of the lock mandrel 1 and the gripper mount 2. This small clearance, by way of example, is about 0.002 inches, to permit free lateral and radial movement but essentially no axial movement. On the other hand, there is a relatively significant amount of diametrical clearance of about 0.500 inches between the hole in the plate 3 and the circular projection on the gripper mount 2. The diametrical clearance both allows and limits lateral movement. Those skilled in the art will appreciate that the foregoing dimensions are merely provided by way of example; therefore, neither this embodiment nor the disclosure in general are limited to these specifications.

As further shown in FIGS. 3, 4A, and 4C, the projection 51 of the lock mandrel 1 is triangular in this example, and reacts to the V-lock slide 7 and the flat lock slide 6 to centralize the lateral and radial movements. The projection 51 includes surfaces 51a, 51b, and 51c, which are contacted by corresponding surfaces 6a of the flat lock slide 6 (as shown in FIG. 5A) and 7b, 7c of the V-lock slide 7 (as shown in FIG. 5B). Although exemplified as being triangular in shape, other shapes may instead be used if desired, provided the engagement surfaces of the lock slides are modified accordingly.

In operation, the pneumatic cylinder 21 is operably connected to the V-lock slide 7, via a cylinder connector 19 that is attached to one end of the cylinder 21 and that is slidably engaged within a correspondingly shaped slot 7d in the slide 7 (seen mostly clearly in FIG. 5B). As the V-lock slide 7 moves, the integral gear racks 72 machined into V-lock slide 7 (also shown in FIG. 5B) engage the pinions 23, causing the pinions 23 to rotate and transfer the movement to the gear teeth 62 of the flat lock slide 6 (shown in FIG. 5A), thus causing the slides 6, 7 to travel in opposing directions, whether opening or closing. This arrangement provides a greater range of motion to the instrument 24 attached to the compensator assembly 100, as the amounts of opening created between the slides 6, 7 is double the stroke of the air cylinder 21. The pinions 23 are set in bearing 20 mounted on the plates 3, 27.

Turning now to FIGS. 5A and 5B, the locking slides 6 and 7 are shown in great detail. Lock slide 6 has a horizontal contact, or receiving, surface 6a and a pair of gear racks 62. Lock slide 7 has a pair of contact, or receiving, surfaces 7b, 7c, which are angled with respect to one another to form a V-shape, and a pair of gear racks 72 (one of which is shown in this view). As mentioned above, their three contact surfaces 6a, 7b, and 7c surround the projection 51 of the lock mandrel 1, when actuated, and engage surfaces 51a, 51b, and 51c. The V-lock slide 7 also includes a T-shaped slot 7d, described previously, into which the cylinder connector 19 is positioned.

Figure 5C:
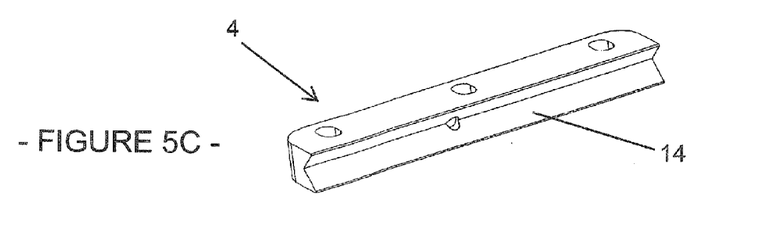
FIG. 5C is a perspective view of a gib, which may be used in cooperation with the lock slides of FIGS. 5A and 5B, according to another aspect of the disclosure.

As shown in FIG. 3, the lock slides 6, 7 travel in respective gibs 4, which are set into the main housing 5. The gibs 4 are shown in FIG. 5C, include a trough 14, which engages the correspondingly shaped edges 64, 74, respectively, of lock slides 6, 7. The gibs 4 may be linear bearings or a form of raceway; therefore, the disclosure is not limited to an embodiment having only gibs 4.

Figure 6:
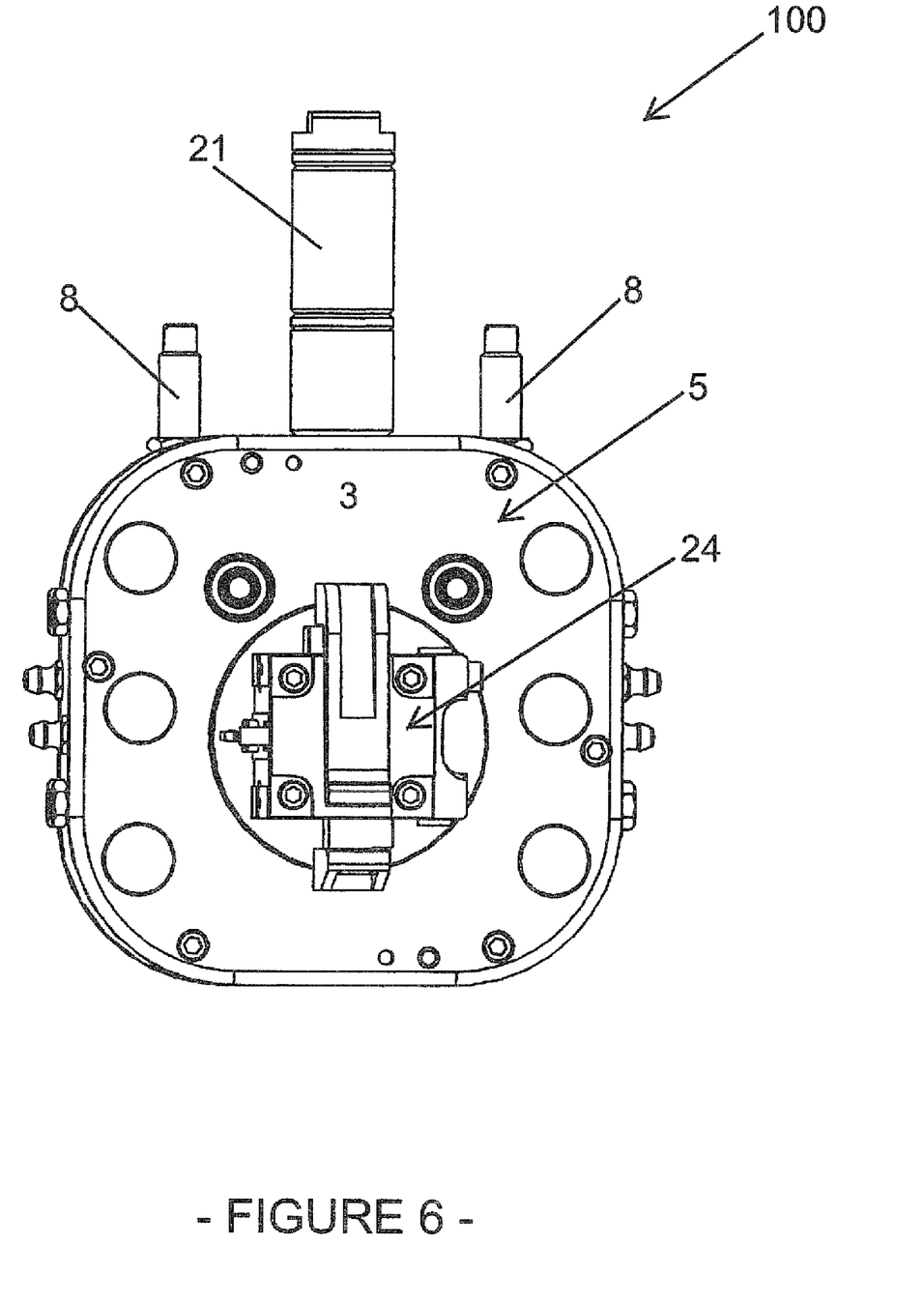
FIG. 6 is a front elevational view of the robotic arm compensator as in FIG. 1.

With respect to FIG. 6, the robotic arm compensator 100 is shown in an assembled condition from a front elevational view, which particularly shows the jaws 22, 25 of the robotic arm compensator.

Having described the robotic arm compensator 100 in general terms, those skilled in the art will understand that the components described above may be modular, removable, and replaceable components and may be sized and shaped differently and located at different positions other than the examples shown. The robotic arm compensator 100 may be better understood with respect to an exemplary operation shown in FIGS. 7 and 8.

Figure 7:
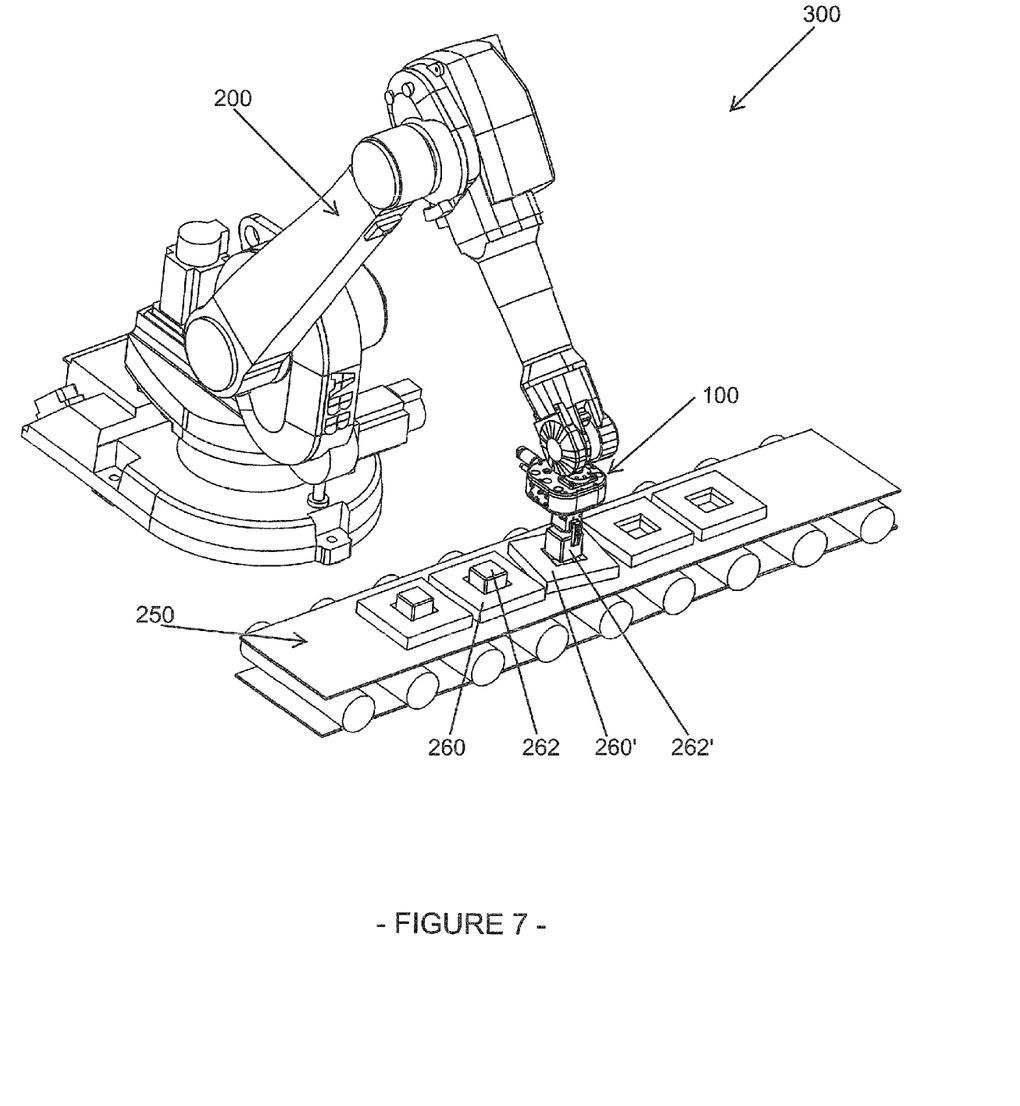
FIG. 7 is a perspective view of the robotic arm compensator as in FIG. 1 being employed in an exemplary environment.
Figure 8:
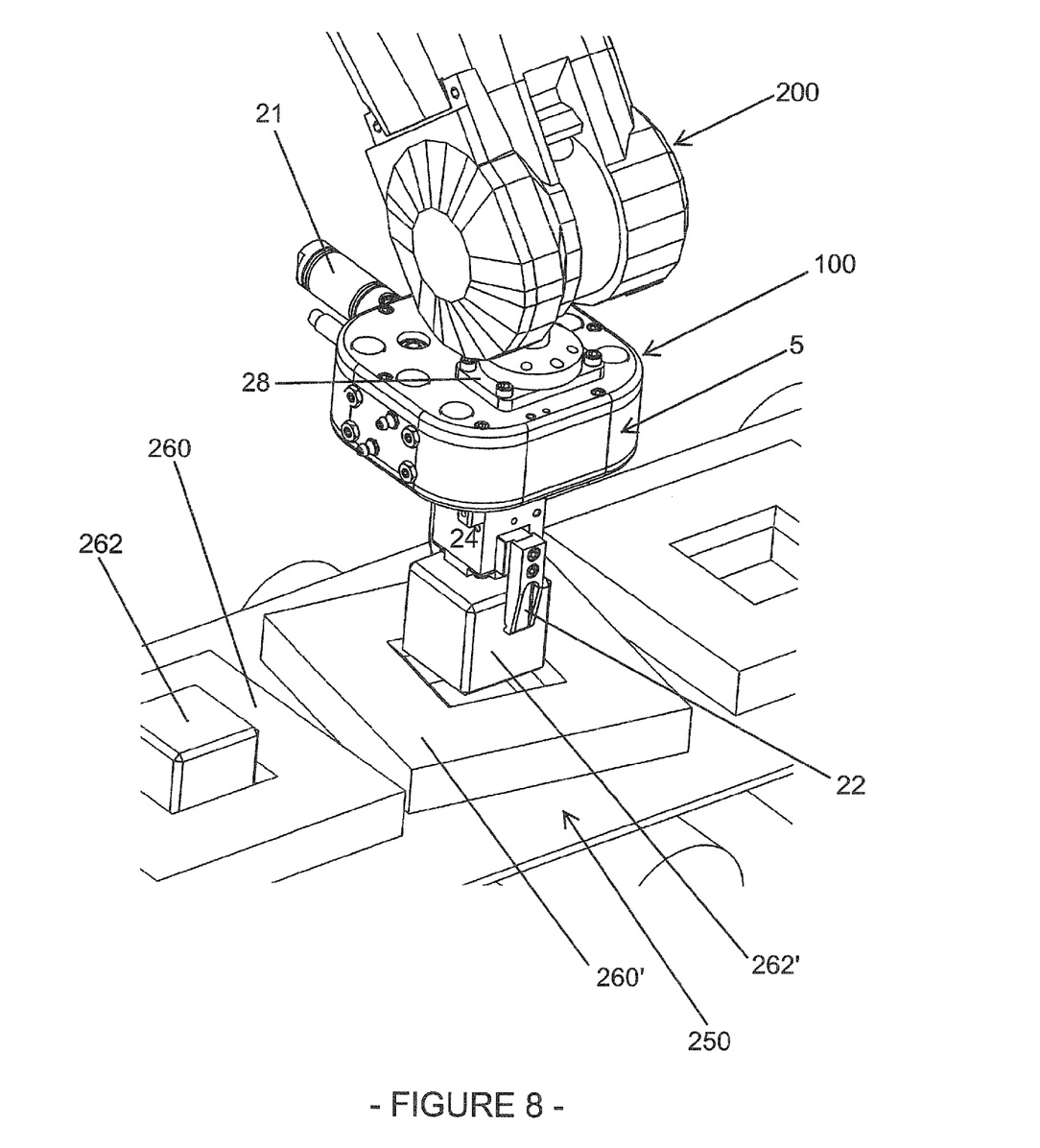
FIG. 8 is a detailed perspective view of the robotic arm compensator as in FIG. 7.

FIGS. 7 and 8 particularly show a robotic arm compensator, such as the robotic arm compensator 100 discussed above, in use in an intended environment, such as an assembly line 300. The assembly line 300 includes a robot (shown generally as 200) and an conveyor line 250, on which a plurality of workpieces 260 are inserted by the robotic arm 200 into a corresponding plurality of receiving pieces 262.

As shown, the robotic arm compensator 100 is attached to a robotic arm 200, via mounting adaptor plate 28, and is used in this example to hold, position, and insert a workpiece 260' into a misaligned receiving piece 262'. Due to the inventive arrangement of the robotic arm compensator 100, as described in detail above, the robotic arm compensator 100 floats, yields, or adjusts to insert the workpiece 260' into the misaligned receiving piece 262'. Once the compensation for the misaligned receiving piece 262' has been made, the robotic arm compensator 100 returns to a registry, or start, position, ready for the next cycle of operations to begin.

As described herein, the robotic arm compensator 100 may provide the instrument 24 with a lateral range of motion of about ±0.25 inches and a radial range of motion of about ±25-degrees.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

That which is claimed is:

1. A robotic arm compensator comprising: a housing having an instrument side and an adapter side; a lock mandrel disposed between the instrument side and the adaptor side, the lock mandrel having a projection defining at least two angled surfaces; a first lock slide being configured to engage a first surface of the angled surfaces in a first state and to disengage the first surface in a second state; a second lock slide opposing the first lock slide and being configured to engage a second surface of the angled surfaces in the first state and to disengage the second surface in the second state; and an instrument attached to the lock mandrel proximate the instrument side, wherein, in or approaching the second state, the lock mandrel is configured to float between the first and second lock slides such that the instrument may move laterally and radially, the lock mandrel being disposed in the housing to limit axial movement of the lock mandrel.

2. The robotic arm compensator as in 1, wherein the projection includes a third surface, the projection being triangular shaped in cross-section.

3. The robotic arm compensator as in 1, wherein the first lock slide defines at least two receiving surfaces disposed at an angle to each other.

4. The robotic arm compensator as in 1, wherein the second lock slide defines a horizontal surface for engaging the second surface of the projection.

5. The robotic arm compensator as in 1, wherein the projection includes a third surface, the projection being triangular shaped in cross-section, the first lock slide defining at least two receiving surfaces disposed at an angle to each other for engaging the first and third surfaces of the projection in the first state, the second lock slide defining a horizontal surface for engaging the second surface of the projection in the first state.

6. The robotic arm compensator as in 1, wherein the first lock slide defines a first gear rack and the second lock slide defines a second gear rack and further comprising a pinion in communication with the first and second gear racks, the pinion being configured to rotate, the first and second lock slides being configured to travel in opposing directions in the first and second states.

7. The robotic arm compensator as in 1, wherein the instrument is a gripper tool.

8. The robotic arm compensator as in 1, wherein the instrument is a pneumatic gripper.

9. The robotic arm compensator as in 1, wherein the instrument is configured to move laterally about ¼ inch.

10. The robotic arm compensator as in 1, further comprising an axis and wherein the instrument is configured to move radially about the axis up to about 25 degrees.

11. The robotic arm compensator as in 1, further comprising an absence of axial compression in the second state.

12. The robotic arm compensator as in 1, further comprising a plurality of gibs, the first and second lock slides being configured to travel in the gibs between the first state and the second state.

13. The robotic arm compensator as in 1, further comprising a propulsion unit in communication with one of the first and second lock slides.

14. The robotic arm compensator as in 13, wherein the propulsion unit is a pneumatic air cylinder.

15. The robotic arm compensator as in 1, further comprising at least one shock absorber disposed proximate one of the first and second lock slides, the shock absorber being configured to arrest movement of one of the first and second lock slides.

* * * * *